United States Patent [19]
Hardage

[11] Patent Number: 5,907,132
[45] Date of Patent: May 25, 1999

[54] APPARATUS AND METHOD FOR ILLUMINATING 3-D GEOLOGIC TARGETS WITH P AND S WAVEFIELDS GENERATED BY EXPLOSIVES THAT GENERATE DIRECTIONALLY CONTROLLED FORCE VECTORS

[76] Inventor: Bob A. Hardage, P.O. Box 202875, Austin, Tex. 78720

[21] Appl. No.: 08/835,186

[22] Filed: Apr. 7, 1997

[51] Int. Cl.[6] .............................. G01V 1/06; E21B 7/00; F42B 1/00
[52] U.S. Cl. ......................... 181/116; 102/306; 175/4.6
[58] Field of Search .................. 181/116; 102/306–310; 175/4.6

[56] References Cited

U.S. PATENT DOCUMENTS

| | | | |
|---|---|---|---|
| 4,038,631 | 7/1977 | Murphy | 340/15.5 |
| 4,428,440 | 1/1984 | McPhee | 175/406 |
| 4,895,218 | 1/1990 | Chen et al. | 181/116 |
| 5,712,829 | 1/1998 | Tang et al. | 367/75 |
| 5,792,977 | 8/1998 | Chawla | 102/307 |

*Primary Examiner*—Harshad Patel
*Attorney, Agent, or Firm*—J. M. (Mark) Gilbreth; Robert W. Strozier; Gilbreth & Strozier, P.C.

[57] ABSTRACT

Methods and apparatus for creating as shear ("S") wave for use in oil and gas exploration, where such S-wave is created by detonating an explosive packaging in a shot hole in a manner that produces directionally controlled S-wave force vectors at each source station across a 3-D survey grid.

19 Claims, 5 Drawing Sheets

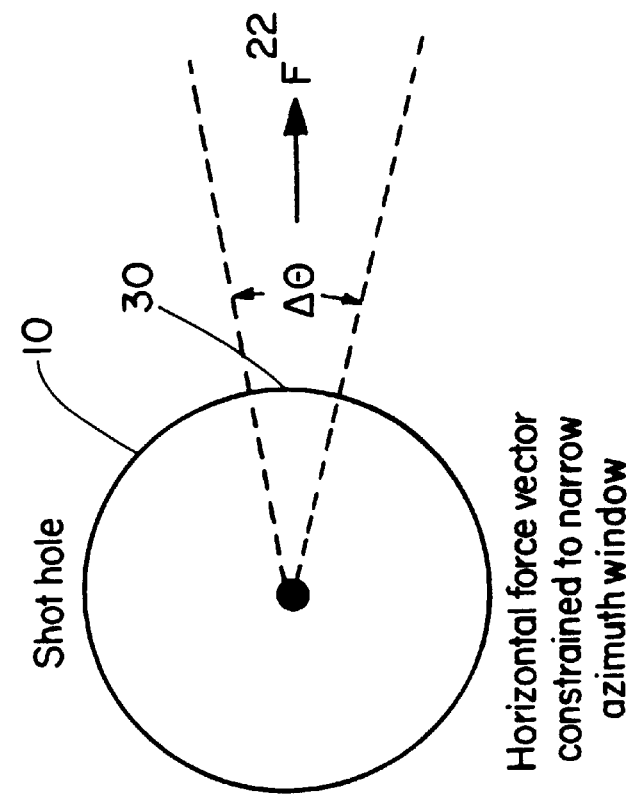
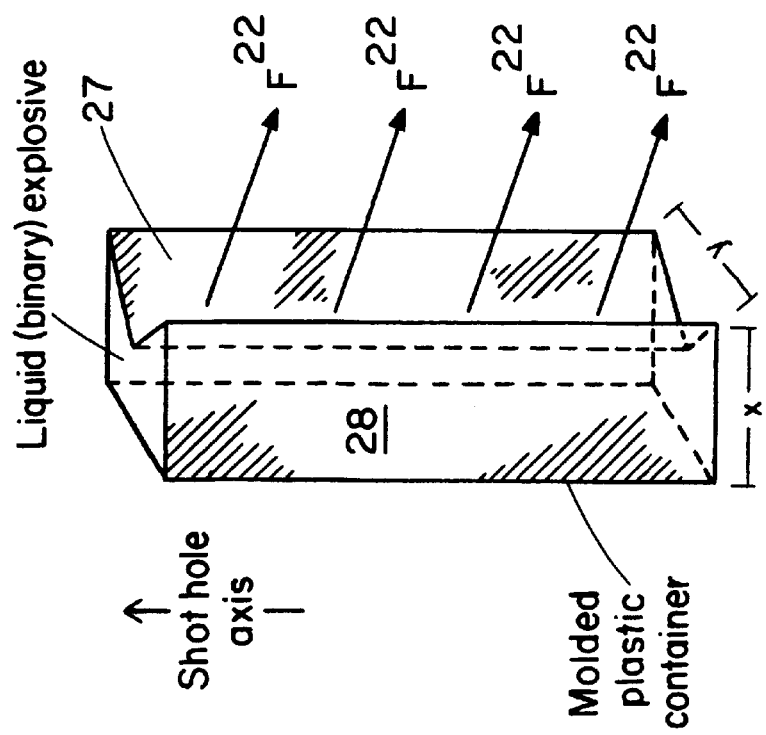
FIG. 4
FIG. 5

APPARATUS AND METHOD FOR ILLUMINATING 3-D GEOLOGIC TARGETS WITH P AND S WAVEFIELDS GENERATED BY EXPLOSIVES THAT GENERATE DIRECTIONALLY CONTROLLED FORCE VECTORS

BACKGROUND OF THE INVENTION

1. Field of the Invention

The present invention relates to generation of acoustic waves, and to imaging of subterranean formations. In another aspect, the present invention relates to methods and apparatus for generation of acoustic waves, and to methods and apparatus for imaging of subterranean hydrocarbon formations. In even another aspect, the present invention relates to methods and apparatus for producing shear ("S") waves, and to apparatus and methods for imaging the subterranean utilizing such S waves. In still another aspect, the present invention relates to producing S waves with an explosive packaging, and to methods for using such S wave sources in oil and gas exploration. In yet another aspect, the present invention relates to S waves produced with an explosive packaging that can be detonated in shot holes in a manner that produces directionally controlled force vectors, and to methods for using such S wave sources in oil and gas exploration.

2. Description of the Related Art

Seismic exploration generally involves generating seismic pulses at the surface of the earth by means of one or more seismic sources. The seismic pulses travel downwardly into the earth with a fractional amount being reflected and/or refracted due to differences in elastic properties at the interface of various subterranean formations.

Detectors, such as seismometers, geophones or hydrophones, produce analog electrical seismic signals or seismic trace signals in response to detected seismic wave reflections and/or refractions. The analog electric seismic signals or seismic trace signals from the detectors can then be recorded. Alternatively, the analog seismic signals or seismic trace signals from the detectors can be sampled and digitized prior to being recorded. The seismic data recorded in either manner are subsequently processed and analyzed to determine the nature and structure of the subterranean formations.

From the recorded data, a seismic section is generated. A seismic section is a seismic image depicting the subsurface layering of a section of earth along a seismic line of profile. The seismic section is an important tool which the geologist studies to determine the nature of the earth's subsurface formations. However, before an array of seismic samples can be converted into a seismic section which can be interpreted by the geologist, the seismograms must be processed to reduce the degradation due to noise.

Seismic interpretation generally involves the study of the behavior of arrival times, amplitudes, velocities, frequencies, and character of the reflections from target horizons. Any changing or anomalous behavior is of particular interest.

It is well known that there are benefits to imaging oil and gas reservoirs utilizing both compression ("P") waves and shear ("S") waves. To date, the bulk of S-wave data acquisition has been done using S-wave vibrators that shake their pads in a horizontal plane.

However, limitations in S-wave sources have not allowed 3-D S-wave data acquisition to be done in a practical, cost-effective manner.

Current S-wave sources are sometimes as much a barrier to S-wave imaging as they are an asset because they: (1) create excessive surface damage; (2) produce inconsistent source wavelets from source station to source station; (3) have narrow signal bandwidths; and (4) the current S-vibrators cannot be phase-locked to create effective source arrays.

Existing S-wave seismic sources cause so much surface damage that property over many attractive oil and gas prospects cannot be permitted for S-wave data acquisition. For example, it is well documented that each cleat of a typical S-wave vibrator pad, which usually has four to six cleats per pad, will cause surface damage on the order of 15 inches deep, 18 inches wide and 24 inches long. During seismic operations, it is not unusual to record and sum twenty or more sweeps at each source station, with the vibrator pad relocated for each of these sweeps, thus causing the ground damage to be repeated again and again across each source station location. After data are generated at a large number of source stations, the ground surface over the prospect takes on the appearance of a huge waffle cake. Landowners often refuse to allow such damage to their property, or they charge excessively high permitting fees for seismic access.

Impulsive S-wave sources, commercially available under the tradenames Omnipulse and ARIS, also create similar surface damage. In some instances, gravel pads are constructed at each source point so that the repeated pounding of the inclined weight used by these impulsive sources does not create a deep depression. While these gravel pads usually do reduce surface damage, they cause data acquisition expenses to increase significantly due to the cost and effort required to construct the gravel pads, and some landowners object just as much to gravel piles being on their property as they do to repeated surface depression damage.

A second deficiency of current S-wave surface seismic sources is that it is difficult (probably impossible in fact) to verify that there is a consistent pad-to-earth coupling at each source station. Consequently, there is no way to know that consistent source wavelets are produced at each source point, and consistent source wavelets are particularly critical if S-waves are to be used for accurate imaging of complex stratigraphy.

A third deficiency of current S-wave surface seismic sources is that the bandwidth of the generated waves is a relatively narrow 10 to 30 Hz. In contrast, properly designed explosive charges and shot holes can sometimes generate P-wave frequencies as high as 150 Hz.

Thus there is a need in the art for methods and apparatus for producing S waves.

There is another need in the art for methods and apparatus for producing S wave for imaging oil and gas reservoirs sources which do not suffer from the disadvantages of the prior art.

There is even another need in the art for methods and apparatus for producing S waves for imaging oil and gas reservoirs, which do not cause excessive surface ground damage.

There is still another need in the art for methods and apparatus for producing S wave sources for imaging oil and gas reservoirs that produce consistent wavelets from source station to source station.

There is yet another need in the art for methods and apparatus for producing S waves for imaging oil and gas reservoirs that produce a broader S-wave bandwidth.

These and other needs in the art will become apparent to one of skill in the art upon review of this specification.

SUMMARY OF THE INVENTION

It is an object of the present invention to provide for methods and apparatus for producing S waves.

It is another object of the present invention to provide for producing S wave for imaging oil and gas reservoirs sources which do not suffer from the disadvantages of the prior art.

It is even another object of the present invention to provide for methods and apparatus for producing S waves for imaging oil and gas reservoirs, which do not cause excessive surface ground damage.

It is still another object of the present invention to provide for methods and apparatus for producing S wave sources for imaging oil and gas reservoirs that produce consistent wavelets from source station to source station.

It is yet another object of the present invention to provide for methods and apparatus for producing S waves for imaging oil and gas reservoirs that produce a broader S-wave bandwidth.

These and other objects will become clear to one of skill in the art upon review of this application.

According to one embodiment of the present invention, there is provided an apparatus for creating horizontal shear waves in the subterranean. The apparatus generally includes a shot hole penetrating the subterranean, and an explosive package oriented to create upon detonation a horizontal force vector oriented within an angle $\Delta\Theta$ relative to the shot hole.

According to another embodiment of the present invention, there is provided an apparatus for imaging the subterranean below the surface with shear waves. The apparatus generally includes a shot hole penetrating the subterranean. The apparatus also includes an explosive package oriented to create upon detonation a horizontal force vector oriented within an angle $\Delta\Theta$ relative to the shot hole, wherein $\Delta\Theta$ is less than about 20°. The apparatus finally includes a three-component geophone positioned on the surface to receive seismic waves generated by horizontal force vector.

According to even another embodiment of the present invention there is provided an apparatus for imaging the subterranean below the surface in the vicinity of a shot point. The apparatus generally includes a multiplicity of shot holes positioned along a source line. The apparatus also includes a first and a second explosive package positioned in separate shot holes and oriented to create upon detonation a horizontal force vector oriented within an angle $\Delta\Theta$ relative to their respective shot holes and along opposite inline directions parallel to the source line. The apparatus further includes a third and a fourth explosive package positioned in separate shot holes and oriented to create upon detonation a horizontal force vector oriented within an angle $\Delta\Theta$ relative to their respective third shot holes and along opposite crossline directions perpendicular to the source line. The apparatus finally includes a fifth explosive package positioned in one of the shot holes and oriented to create upon detonation, a vertical force vector.

According to still another embodiment of the present invention, there is provided a method for creating horizontal shear waves in the subterranean. The method generally includes a first step of positioning an explosive package in a shot hole penetrating the subterranean such that detonation of the explosive package will create a horizontal force vector oriented within an angle $\Delta\Theta$ relative to the shot hole. The method further includes the step of detonating the explosive package. In a further embodiment of imaging the subterranean, the method may include receiving the produced seismic wave with a 3-component geophone, and even further, applying seismic processing techniques to the received data.

According to yet another embodiment of the present invention, there is provided a method for imaging the subterranean below the surface in the vicinity of a shot point. The method includes positioning and detonating, in any order, explosive packages in sets of shot holes along a source line. The first and second explosive packages are each positioned in shot holes and oriented to create upon detonation a horizontal force vector oriented within an angle $\Delta\Theta$ relative to their respective shot holes, each in opposite inline directions parallel to the source line. The third and fourth explosive packages are each positioned in shot holes and oriented to create upon detonation a horizontal force vector oriented within an angle $\Delta\Theta$ relative to their respective shot holes, each in opposite crossline directions perpendicular to the source line. The fifth explosive package is positioned in a shot hole and oriented to create upon detonation, a vertical force vector. In a further embodiment of imaging the subterranean, the method may include receiving the produced seismic waves with a 3-component geophone, and even further applying seismic processing techniques to the received data.

BRIEF DESCRIPTION OF THE DRAWINGS

FIG. 4 is an illustration of another embodiment of explosive package 20 of FIG. 1 showing liquid explosive 27 within suitable shaped container 28, which will produce the desired force vectors 22.

FIG. 5 is a top view of shot hole 20 showing force vector 22 constrained within narrow azimuth window 30 having an opening ΔΘ.

Figure 6:
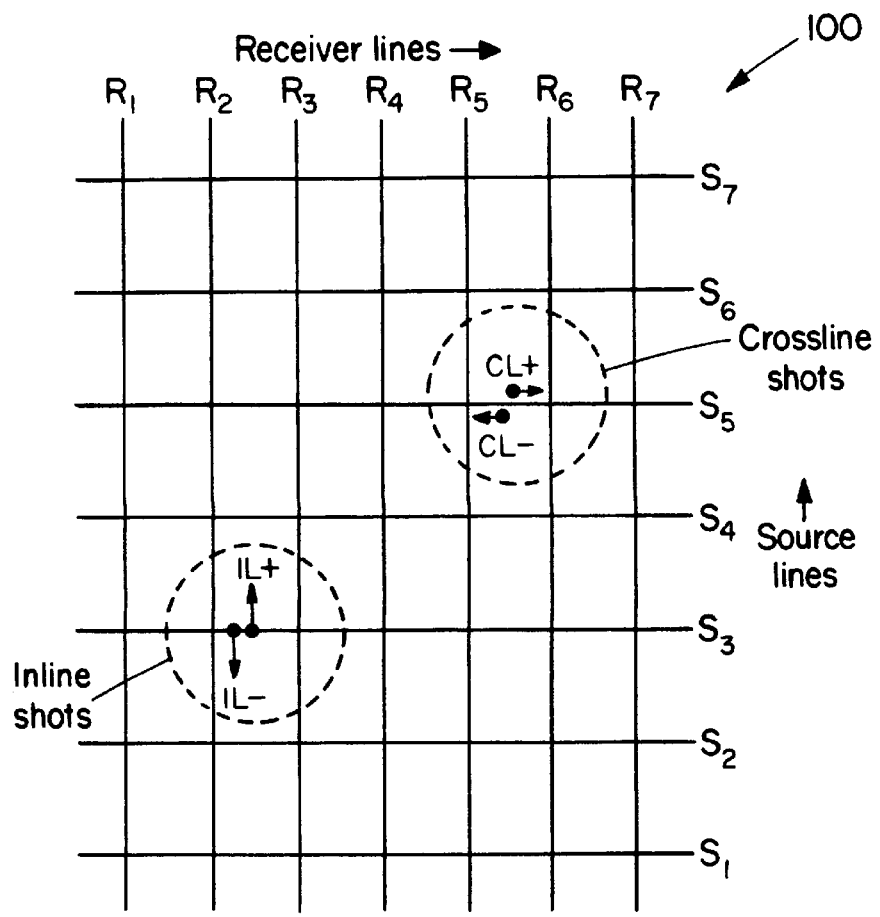

FIG. 6 is a schematic of one embodiment of a 3-D seismic acquisition grid 100 suitable for use in the present invention to record 9-component seismic vector wavefield data.

Figure 7:
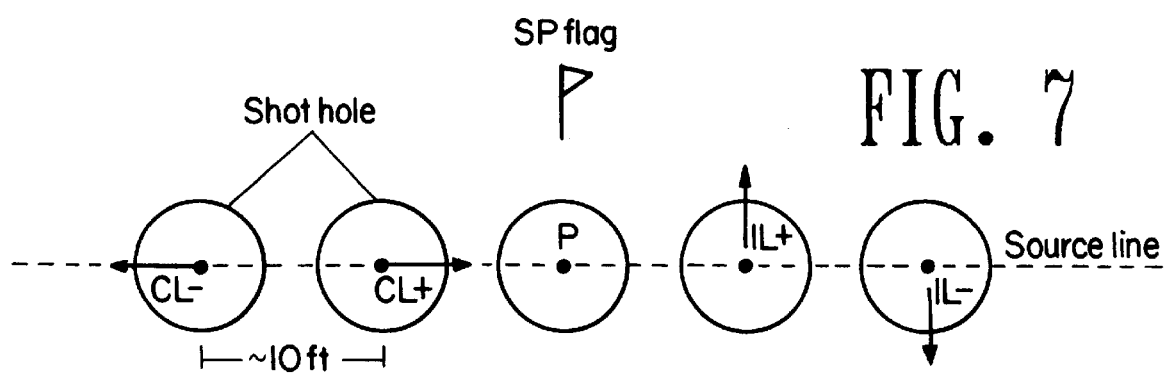

FIG. 7 is a schematic representation of one shotpoint in a seismic vector wavefield acquisition effort, showing five shot holes provided with explosive packaging designed to produce the force vectors CL−, CL+, IL+, IL− and P.

DETAILED DESCRIPTION OF THE INVENTION

In the practice of the present invention, the traditional S-wave vibration source is replaced with an explosive package detonated in shot holes in a manner that produces directionally controlled force vectors. Specifically, the explosive packaging utilized in the present invention produces a directed force vector that is oriented in a specific azimuth direction.

The present invention improves upon many of the limitations encountered utilizing S-wave vibration sources, including surface damage and inconsistent source coupling.

First, the problem of excessive ground damage is reduced because properly prepared shot holes create only minimal ground disturbance. Rarely does a landowner object to the amount of ground damage produced by shot hole drilling, and the permitting fee that landowners demand for shot holes is rarely excessive.

Second, the problem of inconsistent source wavelets is reduced because the energy output from shot hole explosives tends to be efficiently transferred to the earth, which ensures that as compared to the prior art methods for producing S-waves, a far more consistent wavelet is created at each source station regardless of variations in soil consistency. In situations where the near surface is highly attenuating or causes excessive static problems, consistent energy transfer (that is, consistent wavelets) can be assured by drilling shot holes that extend below all, or most, of the troublesome near-surface.

An additional advantage to using shot hole explosives is that a broader S-wave bandwidth should be achieved. Prior art surface-generated S-wave data are notoriously narrowband, on the order of 10–30 Hz, which limits the resolution and utility of S-waves. In contrast, properly designed explosive charges and shot holes can sometimes generate P-wave frequencies as high as 150 Hz. The present invention of utilizing explosive shots to generate S-waves should allow creation of broadband S-wave data of similar frequency content as is associated with the explosive shots that generate P-waves.

Figure 1:
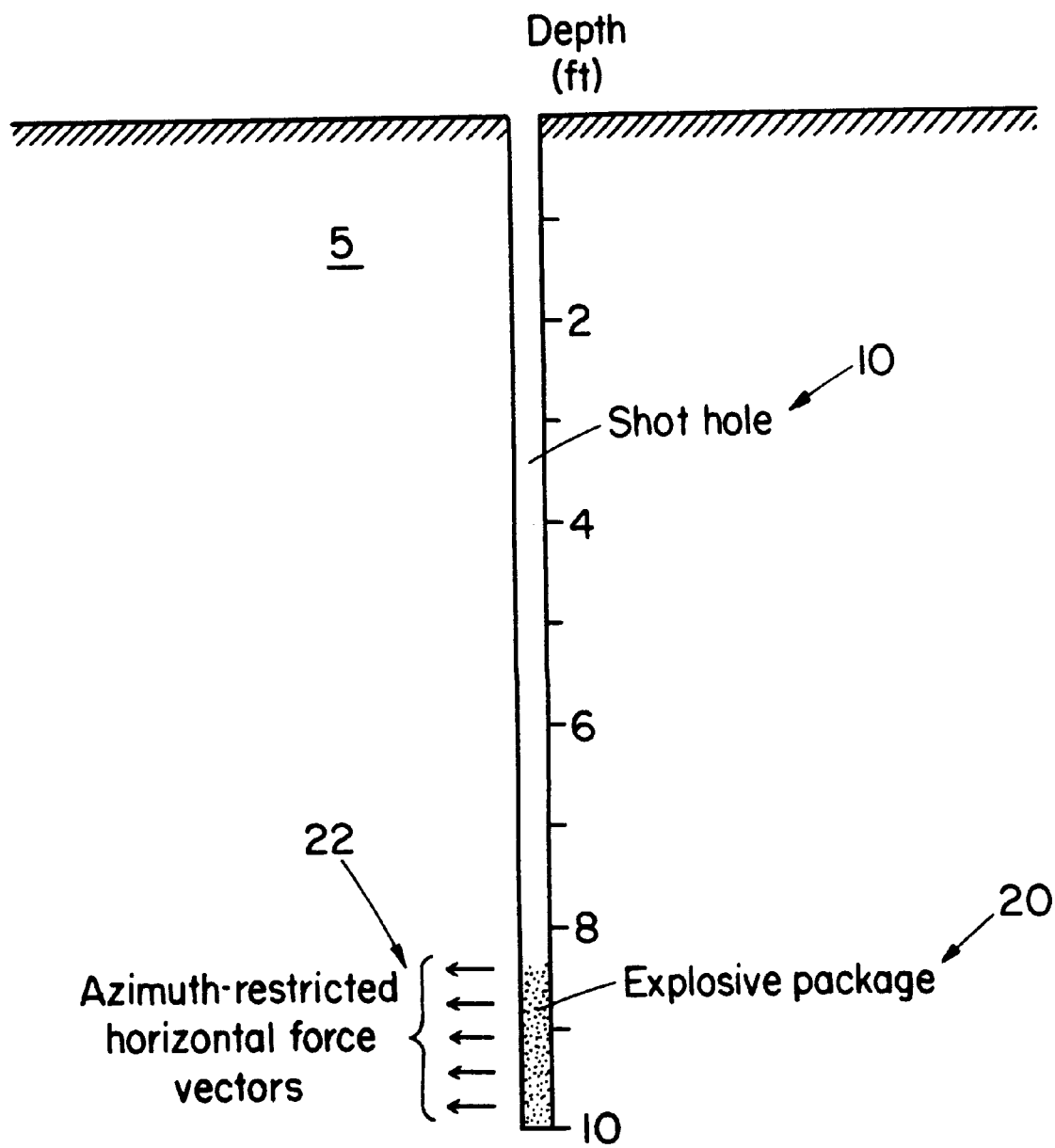
FIG. 1 is a schematic of one embodiment of the present invention, showing shot hole 10 penetrating the subterranean 5 and containing explosive packaging 20.

Referring now to FIG. 1, there is shown a schematic representation of one embodiment of the present invention, showing the subterranean 5, penetrated by shot hole 10, in which is positioned explosive package 20. Upon detonation of explosive package 20, one or more horizontally directed force vectors 22 create a horizontal impulse in a specific desired azimuth direction.

Apparatus and methods for drilling shot hole 10 are well known in the art, and any suitable apparatus and method may be utilized to drill shot hole 10 for the present invention. The diameter of shot hole 10 may be any suitable diameter that will accommodate explosive packaging 20. While any suitable diameter may be utilized for shot hole 10, commercially common shot hole diameters utilized for creating P-waves, are on the order of 4 inches, rarely exceeding 5 inches.

In the practice of the present invention, shot hole 10 will be made as shallow as possible for reasons of economy, but sufficiently deep to ensure the optimum transfer of explosive energy into the earth. In some instances, it is desirable to detonate explosive packaging 20 at or near the depth of the formation of interest, in which instance, shot hole 10 may be on the order of thousands of feet deep. However, in most instances, shot hole 10 is generally in the range of about 1 to about 500 feet deep, preferably in the range of about 5 to about 200 feet deep, more preferably in the range of about 8 to about 100 feet deep, and even more preferably in the range of about 10 to about 60 feet deep.

In the practice of the present invention, explosive packaging 20 must produce an output force vector oriented in a horizontal direction so that it creates a robust shear impulse to the earth. Any force vector component that is non-horizontal will produce an increased proportion of P-wave energy, which is not desirable. More specifically, the resultant force vector must be oriented in a specific azimuth direction.

Non-limiting examples of suitable materials useful as explosive packaging 20 include a vertical stack of shaped charges, a vertical stack of directional charges, or a liquid explosive in a container suitably shaped to create a horizontally shaped.

Figure 2:
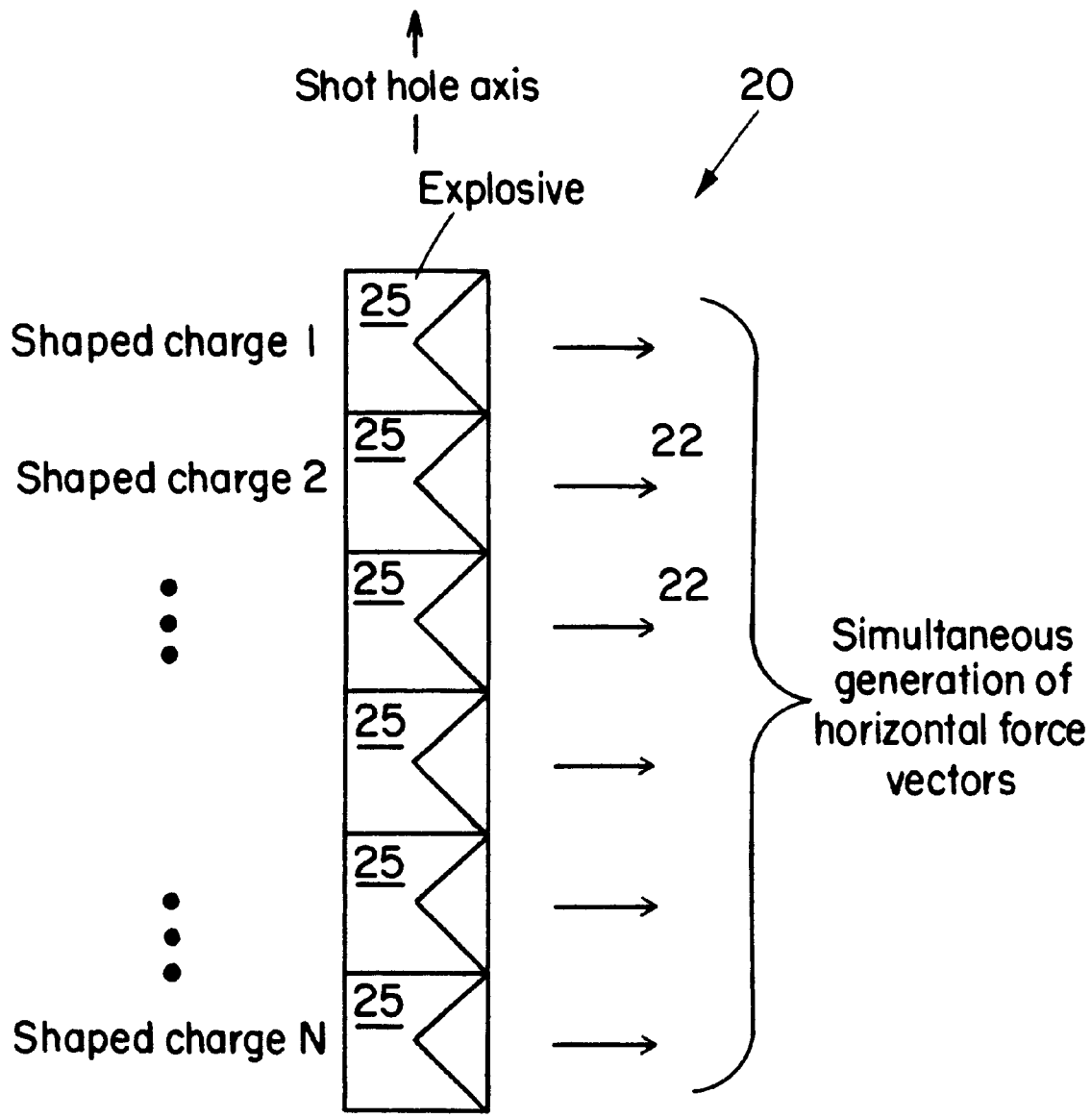
FIG. 2 is a schematic of one embodiment of explosive packaging 20 of FIG. 1, showing N number of shaped charges 25 simultaneously firing to generate the required horizontally oriented force vectors 22.

Referring now to FIG. 2, there is shown one embodiment of explosive packaging 20 of the present invention utilizing a vertical stack of shaped charges 25. As shown in FIG. 2, explosive packaging 20 includes N number of shaped charges 25, sized relative to the diameter of shot hole 10 so that they may be correctly oriented to produce a force vector oriented through a narrow azimuth aperture. N number of shaped charges 25 are fired simultaneously to generate the required horizontally oriented force vector.

Shaped charge 25 is generally any suitable type of explosive charge that is suitable to produce the required S-wave. Non-limiting examples of suitable commercially available shaped charges include the DES-10, DES-32, and DES-80 series offered by the Austin Powder Company.

Figure 3:
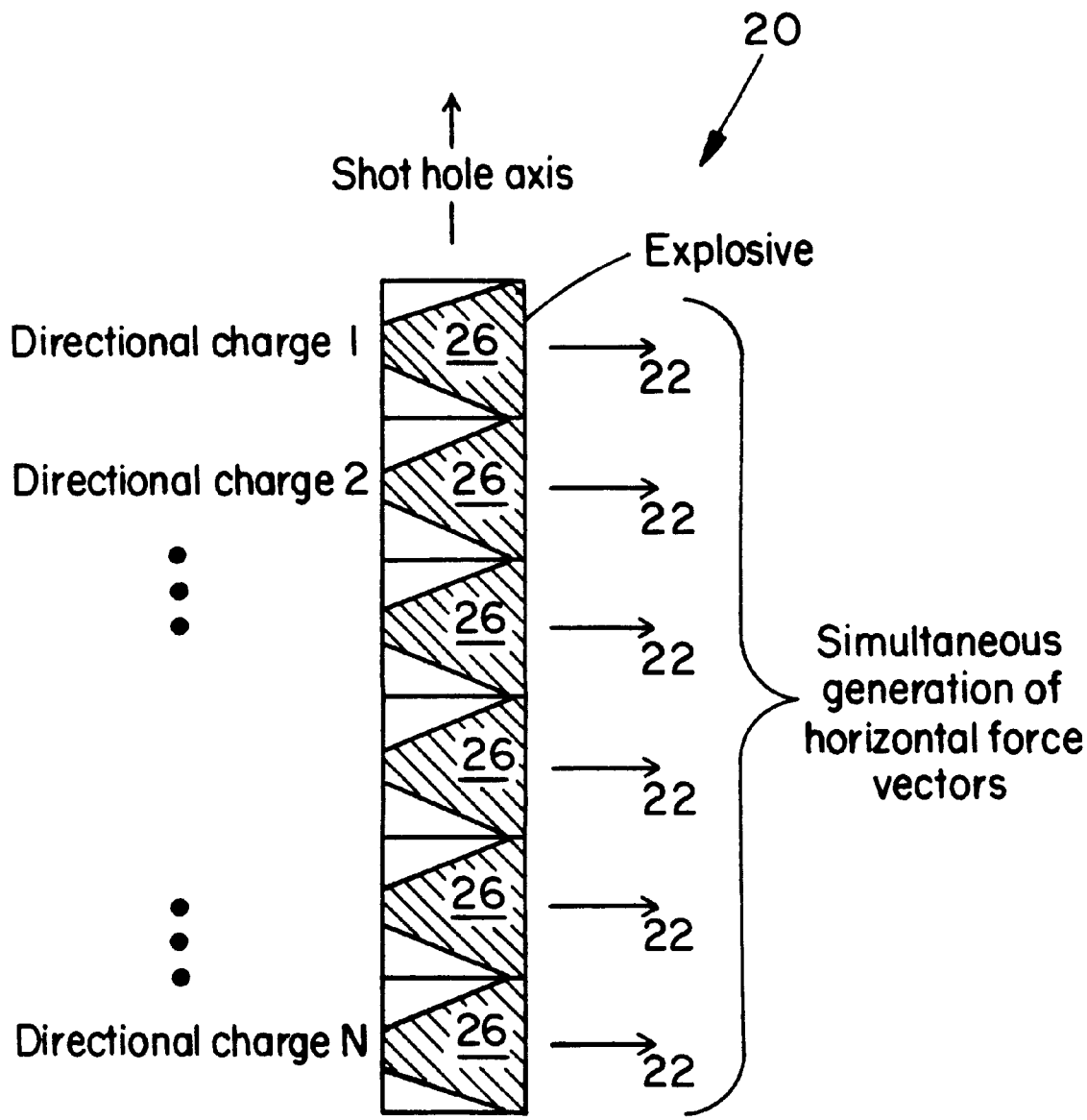
FIG. 3 is a schematic of another embodiment of explosive packaging 20 of FIG. 1, showing N number of directional charges 26 simultaneously firing to generate the required horizontally oriented force vectors 22.

Referring additionally to FIG. 3, there is shown another embodiment of explosive packaging 20 of the present invention utilizing a vertical stack of directional charges 26. As shown in FIG. 3, explosive packaging 20 includes N number of directional charges 26, which are suitable sized relative to the diameter of shot hole 10 so that they may be correctly oriented to produce a force vector oriented through a narrow azimuth aperture. N number of directional charges 26 are fired simultaneously to generate the required horizontally oriented force vector.

Directional charge 26 is generally any suitable type of explosive charge that is suitable to produce the required S-wave. Non-limiting examples of suitable commercially available directional charges include the Trojan C-7, C-10, and C-20 series of charges offered by Ensign-Bickford Company.

Shaped charges 25 and directional charges 26 are generally of any suitable weight to produce the desired S-wave. The weight of each shaped charge 25 or directional charge 26 will vary according to the physical properties of the subterranean to be imaged, the arrangement of the geophones, the depth of the shot hole, and any other factors as are known to those of skill in the art. Generally, each shaped charge 25 or directional charge 26 will weigh in the range of about 1 oz. to about 32 oz., preferably in the range of about 1 oz. to about 16 oz. and more preferably in the range of about 2 oz. to about 8 oz. It is noted that the charges must also be sized to fit into the shot hole.

In the practice of the present invention, any suitable number of shaped charges 25 or directional charges 26 may be utilized, taking into account the physical properties of the subterranean to be imaged, the arrangement of the geophones, the depth of the shot hole, and any other factors as are known to those of skill in the art. Generally, N will be in the range of about 1 to about 20, preferably in the range of about 1 to about 10, and more preferably in the range of about 1 to about 5.

Referring additionally to FIG. 4, there is shown even another embodiment of explosive packaging 20 of the present invention utilizing a liquid charge 27 residing in a suitably shaped container 28.

Container 28 may be comprised of any material that is suitable for holding liquid charge 27, and that allows for generation of horizontal force vectors 22 through a narrow azimuth aperture. Suitable materials for container 28 include thermoplastics, thermosets, elastomers, metals and ceramics.

Non-limiting examples of suitable liquid explosive materials include the nitromethane or the nitromethane/nitroethane mixtures offered by the Grace Company.

In the practice of the present invention, any suitable amount of liquid explosive 27 may be utilized provided that the desired S-wave is produced. In general, the weight of liquid explosive 27 utilized will vary according to the physical properties of the subterranean to be imaged, the arrangement of the geophones, the depth of the shot hole, and any other factors as are known to those of skill in the art. Generally, the weight of liquid explosive 27 utilized will be in the range of about 1 oz. to about 32 oz., preferably in the range of about 1 oz. to about 16 oz., and more preferably in the range of about 2 oz. to about 8 oz. for small shot holes.

Referring additionally to FIG. 5, there is shown a top view of shot hole 10, showing narrow azimuth aperture 30 through which it is desired that force vectors 22 be constrained. In the practice of the present invention, aperture 30 $\Delta\Theta$ will generally be in the range of about 1° to about 45°, preferably in the range of about 5° to about 30°, and more preferably in the range of about 5° to about 20°.

In the practice of the present invention, horizontal will generally mean horizontal plus or minus in the range of about 0° to about 45°, preferably in the range of about 5° to about 30°, and more preferably in the range of about 5° to about 20°.

Methods and apparatus for detonating explosive packaging 20 are well known to those of skill in the art, and any suitable detonation method and apparatus may be utilized. Suitable detonation methods and apparatus include electrical caps inserted into cap wells that are molded into the explosive material, detonation cord and/or booster cord that passes through the interior of the explosive material, remotely positioned semiconductor bridge circuits, and special end-initiated caps that attach to the extreme outer portion of the explosive material.

In the practice of the present invention, any suitable arrangement of a seismic acquisition grid may be utilized. Generally, any seismic acquisition grid suitable for use with standard P-wave seismic recording may be utilized in the practice of the present invention.

Referring now to FIG. 6, there is shown one embodiment of a suitable seismic acquisition grid 100 utilized to record 9-component seismic wavefield data. The source and receive lines are laid out just as they are for standard P-wave seismic recording, however, vector wavefield sources must be used at each source point and 3-component receivers must be employed at all receiver locations.

As shown in FIG. 6, the sources must apply the horizontal impulse to the earth in carefully controlled azimuth directions. In a preferred embodiment of the present invention, inline impulses are applied in both positive ("IL+") and negative ("IL–") inline directions (meaning parallel to receiver lines), and crossline impulses are applied in both positive ("CL+") and negative ("CL–") crossline directions (meaning perpendicular to receiver lines).

Referring now to FIG. 7, there is shown a schematic representation of the types of output force vectors which may be utilized in the present invention for 9-component data recording. The surveyed shotpoint coordinate is indicated by the shotpoint flag SP. Shot holes are drilled symmetrically about this coordinate point along the source line. The shot hole labeled P is loaded with a conventional P-wave explosive package. The other four holes are loaded with S-wave packages oriented to produce the force vectors CL–, Cl+, IL–, IL+ in the orientations as shown.

In typical 3-D seismic recording, source stations are usually surveyed at intervals of 110, 165, or 220 ft along each source line. For seismic vector wavefield data acquisition, it is preferred to utilize a minimum of five shot holes at each of these source stations as shown in FIG. 7. The position order, shot hole spacing, and locations of the shot holes about the shot flag are arbitrary, but the arrangement shown in FIG. 7 is one suitable embodiment, with the 10 foot spacing understood to be arbitrary.

The shot holes may be detonated in any suitable order. It should be understood that the shot order is not important and is not believed to have an effect on the final result, as the gathered seismic data will be considered additive. One suitable embodiment for a shooting sequence is as follows:

First shot
  Detonate the shot hole labeled P. This hole is loaded with a charge that applies a downward-directed force vector. This shot generates standard P-wave seismic data.
Second shot
  Detonate the shot hole that creates the horizontal force vector CL– oriented in the negative crossline direction.

Third shot

Detonate the shot hole that creates the horizontal force vector CL+ oriented in the positive crossline direction.

Fourth shot

Detonate the shot hole that creates the horizontal force vector IL+ oriented in the positive inline direction.

Fifth shot

Detonate the shot hole that creates the horizontal force vector IL– oriented in the negative inline direction.

After each detonation, seismic data are recorded utilizing 3-component receivers as is well known in the art.

After completing all of the detonations, the recorded seismic data must be processed. Any suitable method of processing seismic data may be utilized in processing the data gathered by the present invention, including the methods disclosed by B. A. Hardage in "Combining P-wave and S-wave seismic data to improve prospect evaluation", Report of Investigations No. 237, Bureau of Economic Geology, Austin, Tex., 1996, herein incorporated by reference.

In processing the data of the present invention, the data of the crossline shots are preferably algebraically combined as follows:

$$CL=(CL+)-(CL-) \quad (1)$$

which creates a crossline shear wavefield CL.

The purposes of this wavefield subtraction are to attenuate the amount of P-wave energy contained in illuminating wavefield CL and to double the amount of S-wave energy that has a horizontal displacement vector oriented in the crossline direction. The assumptions that are inherent in this data processing step are: (1) wavefields CL+ and CL– have identical P-wave components, and (2) the horizontal particle displacement vector generated by wavefield CL– is oriented in the opposite direction as is the particle displacement vector produced by wavefield CL+. Subtracting the two wavefields thus cancels (or at least attenuates) the P-wave portions of the two wavefields and adds the S-wave components in phase to effectively double the S-wave energy contained in CL. The result is a shear wavefield CL that is dominated by a particle displacement vector oriented in the crossline direction.

In a similar fashion, the inline shot data are likewise preferably algebraically combined as follows:

$$IL=(IL+)-(IL-)+tm \quad (2)$$

which provides the shear wavefield dominated by a particle displacement vector oriented in the inline direction.

Using this sequence of explosive shots, a targeted reservoir can be illuminated with three independent wavefields, P, CL, and IL, that have particle displacement vectors that are approximately orthogonal to each other.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

I claim:

1. Apparatus for creating horizontal shear waves in subterranean, the apparatus comprising:

(a) a shot hole penetrating the subterranean; and (b) an explosive package oriented to create upon detonation a horizontal force vector oriented within an angle $\Delta\Theta$ relative to the shot hole;

wherein $\Delta\Theta$ is less than about 30°, and wherein the explosive package comprises a liquid explosive.

2. The apparatus of claim 1 wherein the explosive package comprises N number of shaped charges.

3. The apparatus of claim 2 wherein N is in the range of about 1 to about 20.

4. The apparatus of claim 1 wherein the explosive package comprises N number of directional charges.

5. The apparatus of claim 4 wherein N is in the range of about 1 to about 20.

6. An apparatus for imaging the subterranean below the surface with shear waves, the apparatus comprising:

(a) a shot hole penetrating the subterranean;

(b) an explosive package oriented to create upon detonation a horizontal force vector oriented within an angle $\Delta\Theta$ relative to the shot hole, wherein $\Delta\Theta$ is less than about 30°; and (c) a three component geophone positioned on the surface to receive seismic waves generated by horizontal force vector.

7. The apparatus of claim 6 wherein the explosive package comprises N number of shaped charges.

8. The apparatus of claim 7 wherein N is in the range of about 1 to about 30.

9. The apparatus of claim 6 wherein the explosive package comprises N number of directional charges.

10. The apparatus of claim 9 wherein N is in the range of about 1 to about 20.

11. The apparatus of claim 6 wherein the explosive package comprises a liquid explosive.

12. An apparatus for imaging the subterranean below the surface in the vicinity of a shot point, the apparatus comprising:

(a) a first shot hole penetrating the subterranean, and positioned along a source line on the surface;

(b) a first explosive package oriented to create upon detonation a horizontal force vector oriented within an angle $\Delta\Theta$ relative to the first shot hole and along a first inline direction parallel to the source line;

(c) a second shot hole penetrating the subterranean, and positioned along the source line;

(d) a second explosive package oriented to create upon detonation a horizontal force vector oriented within an angle $\Delta\Theta$ relative to the second shot hole and along a second inline direction parallel to the source line and opposite the first inline direction;

(e) a third shot hole penetrating the subterranean, and positioned along the source line;

(f) a third explosive package oriented to create upon detonation a horizontal force vector oriented within an angle $\Delta\Theta$ relative to the third shot hole and along a first crossline direction perpendicular to the source line;

(g) a fourth shot hole penetrating the subterranean, and positioned along the source line;

(h) a fourth explosive package oriented to create upon detonation a horizontal force vector oriented within an angle ΔΘ relative to the fourth shot hole and along a second crossline direction perpendicular to the source line and opposite the first crossline direction;

(i) a fifth shot hole penetrating the subterranean and positioned along the source line; and (j) a fifth explosive package oriented to create upon detonation, a vertical force vector.

13. The apparatus of claim 12 wherein any of the explosive packages comprise N number of shaped charges.

14. The apparatus of claim 13 wherein N is in the range of about 1 to about 20.

15. The apparatus of claim 12 wherein any of the explosive packages comprise N number of directional charges.

16. The apparatus of claim 15 wherein N is in the range of about 1 to about 20.

17. The apparatus of claim 12 wherein any of the explosive packages comprise a liquid explosive.

18. The apparatus of claim 12 further comprising:

(k) a 3-component geophone positioned on the surface.

19. A method for imaging the subterranean below the surface in the vicinity of a shot point, the method comprising:

(a) positioning in a first shot hole penetrating the subterranean, and positioned along a source line on the surface, a first explosive package oriented to create upon detonation a horizontal force vector oriented within an angle ΔΘ relative to the first shot hole and along a first inline direction parallel to the source line;

(b) detonating the first explosive package;

(c) receiving seismic data created from detonating the first explosive package with a 3-component geophone positioned on the surface;

(d) positioning in a second shot hole penetrating the subterranean, and positioned along the source line a second explosive package oriented to create upon detonation a horizontal force vector oriented within an angle ΔΘ relative to the second shot hole and along a second inline direction parallel to the source line and opposite the first inline direction;

(e) detonating the second explosive package;

(f) receiving seismic data created from detonating the second explosive package with a 3-component geophone positioned on the surface;

(g) positioning in a third shot hole penetrating the subterranean, and positioned along the source line a third explosive package oriented to create upon detonation a horizontal force vector oriented within an angle ΔΘ relative to the third shot hole and along a first crossline direction perpendicular to the source line;

(h) detonating the third explosive package;

(i) receiving seismic data created from detonating the third explosive package with a 3-component geophone positioned on the surface;

(j) positioning in a fourth shot hole penetrating the subterranean, and positioned along the source line a fourth explosive package oriented to create upon detonation a horizontal force vector oriented within an angle ΔΘ relative to the fourth shot hole and along a second crossline direction perpendicular to the source line and opposite the first crossline direction;

(k) detonating the fourth explosive package;

(l) receiving seismic data created from detonating the fourth explosive package with a 3-component geophone positioned on the surface;

(m) positioning in a fifth shot hole penetrating the subterranean and positioned along the source line, a fifth explosive package oriented to create upon detonation, a vertical force vector;

(n) detonating the fifth explosive package; and (o) receiving seismic data created from detonating the fifth explosive package with a 3-component geophone positioned on the surface.

* * * * *